United States Patent
Matthews

[15] 3,671,699
[45] June 20, 1972

[54] POWER TOOL CONTROL

[72] Inventor: Benjamin H. Matthews, Peninsula, Ohio

[73] Assignee: Lucerne Products, Inc., Northfield, Ohio

[22] Filed: Nov. 19, 1970

[21] Appl. No.: 90,985

[52] U.S. Cl. .................................. 200/157, 310/50, 310/71, 310/42
[51] Int. Cl. ...................................................... H01h 21/10
[58] Field of Search ................ 310/50, 42, 47, 71; 200/155, 200/157, 164, 166 A; 173/117 C

[56] References Cited

UNITED STATES PATENTS

| | | | |
|---|---|---|---|
| 3,413,498 | 11/1968 | Bowden | 310/47 |
| 3,311,763 | 3/1967 | Jepson | 310/50 |
| 2,719,945 | 10/1955 | Tull | 310/50 |
| 2,525,839 | 10/1950 | Sparklin | 310/50 |
| 2,876,369 | 3/1959 | Doerner | 310/50 |
| 3,536,943 | 10/1970 | Bowden | 310/50 |

Primary Examiner—L. T. Hix
Assistant Examiner—R. Skudy
Attorney—Baldwin, Egan, Walling & Fetzer

[57] ABSTRACT

A control for power tools, power appliances, or the like, such as for instance, an electric drill, wherein a trigger member is movable on a support from an off position to an on position and vice versa. An electrical conducting spring-like member coacts with the trigger for movement therewith. An electric motor including opposing brush assemblies is provided in the tool with a current conducting line connected to one side of the motor and another current conducting line connected to the electrical conducting member. The trigger is operative to move the electrical conducting member into electrical conducting relation to one of the brush assemblies thereby completing the circuit to the motor upon predetermined movement of the trigger toward its on position. Release of the trigger by the finger of the operator causes the spring-like electrical conducting member to move away from circuit completing relation with the motor thereby deenergizing the motor, and moving the trigger toward off position.

16 Claims, 2 Drawing Figures

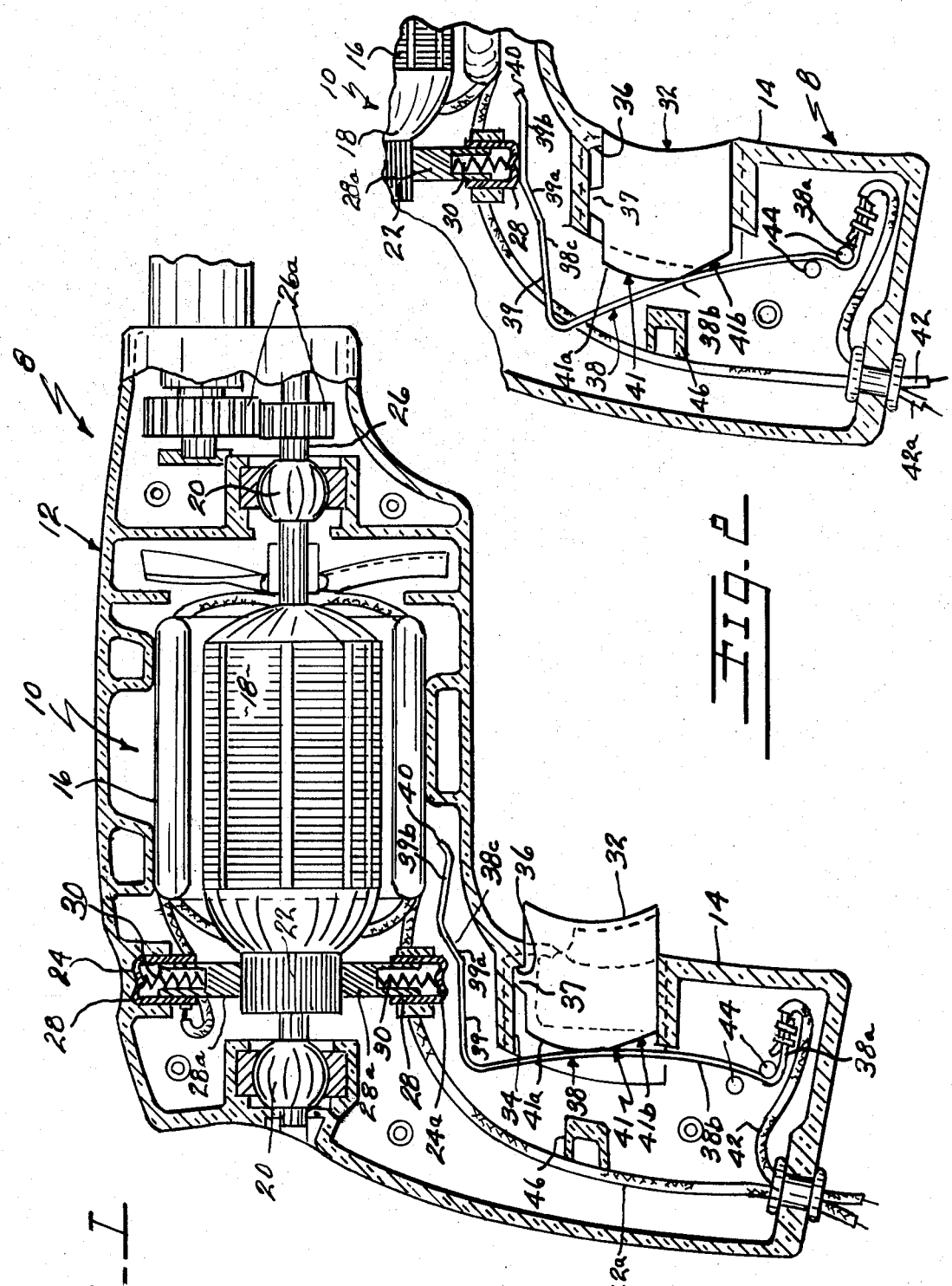

POWER TOOL CONTROL

This invention relates in general to electrically driven tools, power appliances, or the like, such as for instance, an electric drill, and more particularly to a control for turning the motor of the tool or appliance on and off upon movement of the trigger.

BACKGROUND OF THE INVENTION

Trigger controlled power operated tools, appliances, or the like are well known in the art, some of which also include arrangements for controlling the speed of the motor of the tool by movement of the trigger mechanism. One of these patents is U.S. Pat. No. 2,609,525 dated Sept. 2, 1952 in the name of C.H. Gemmill and entitled "Electrically Driven Portable Appliance." However, such prior art arrangements are generally relatively complex and usually much more expensive as compared to the present arrangement.

SUMMARY OF THE INVENTION

The present invention provides a control for electrically driven tools, power appliances, or the like, such as for instance, an electrical drill, wherein the trigger mechanism has spring means coacting with the trigger and wherein electrical conducting means is provided adapted for coaction with the trigger for coupling electrical current to the motor for energization of the motor upon actuation of the trigger mechanism to "on" position, and upon deactuation of the trigger mechanism toward "off" position, of uncoupling the current from the motor to thus deenergize the motor. The present arrangement provides a mechanism wherein the spring means which operates to urge the trigger toward "off" position is also utilized to couple and uncouple power to and from the motor, and thus making an extremely simple and economical arrangement for energizing and deenergizing the electric motor of the tool or appliance.

Accordingly, an object of the invention is to provide a novel control for electrically powered tools, appliances, and the like.

Another object of the invention is to provide a novel control for an electrically powered tool or appliance wherein a trigger mechanism is provided for movement from an off position to an on position and vice versa, and with electrical conducting means of a spring-like nature coacting with the trigger mechanism for coupling the electric motor to one side of the power line.

A still further object of the invention is to provide a control of the latter described type wherein the electrical conducting means serves as a resilient means for urging the trigger to an off position and wherein such spring-like electrical conducting means is movable by the trigger upon manual actuation of the latter so as to couple the motor to one side of the power line so as to complete the circuit to a source of current.

A still further object of the invention is to provide an electrically powered driven tool such as an electrical drill utilizing a series commutator motor including spaced brush assemblies, and wherein the trigger mechanism is adapted to move a spring-like strip of electrical conducting material from an uncoupled to a coupled position with one of said brush assemblies and with the spring-like strip mechanism being coupled with one side of a source of electrical current, and with the motor being coupled to the other side of the source of electrical current.

Other objects and advantages of the invention will be apparent from the following description taken in conjunction with the accompanying drawings wherein:

BRIEF DESCRIPTION OF THE DRAWINGS

FIG. 1 is a fragmentary, sectional elevational view of an electrical power tool embodying the invention; the trigger of the tool, which as illustrated is an electric drill, is in its off position;

FIG. 2 is a fragmentary, sectional view of primarily the handle portion of the tool of FIG. 1, and illustrating the trigger having been moved to on position to move the spring strip electrical conducting member into coupled relation with one of the brush assemblies of the tool motor, thus completing the circuit to the motor.

DESCRIPTION OF THE PREFERRED EMBODIMENT

Referring now again to the drawings, there is illustrated an electrically driven tool 8 which in the embodiment illustrated is an electric drill, comprising an electric motor 10 which is a series commutator-type universal motor, a frame or housing for the motor generally designated 12, and a pistol grip 14, which in the embodiment illustrated is integrally formed with the housing 12. Housing 12 and grip 14 are preferably formed of electrical insulating material, many of which are known in the art.

Electric motor 10 includes a stator 16, and an armature 18 which is supported on bearing mechanism 20 for rotation upon application of current to the armature 18 via commutator 22 and brush assemblies 24, 24a. Shaft 26 of the armature is coupled via gearing 26a to the output chuck of the drill for rotating the chuck and drilling for instance a hole in a part.

Each of the brush assemblies 24, 24a includes an electrically conducting housing portion 28 which may be made of metal or the like, and a carbon brush member 28a resiliently urged into engagement with the commutator 22 by associated spring 30 which may be electrically conducting.

A trigger member 32 which is adapted for engagement with and actuation by the finger of a workman, is provided in a slot 34 formed in the trigger or handle portion 14 of the housing, with the trigger being adapted to move lengthwise in slot 34 from the "off" position shown in FIG. 1 to the "on" position shown in FIG. 2 and vice versa. Trigger member 32 is preferably formed of electrically insulating material. The trigger member 32 may include a lug 36 for engagement with shoulder 37 in the housing to limit the outward movement of the trigger member with respect to the housing. The rear end of the trigger member may be of the cam shaped arcuate configuration 41 shown, adapted for engagement with, in the embodiment shown, flat strip-like member 38 having spring-like characteristics. For instance, member 38 may be formed of spring-like metal and is operative to engage the rear end of the trigger 32 and urge the latter toward "off" position. Upper cam section 41a may be of generally circular segmental extension in side elevation while lower cam section 41b can be of a lesser curvature providing a flatter cam surface for engagement with member 38.

Member 38 may comprise a foot portion 38a extending generally horizontally, and generally arcuate, vertically extending body portion 38b. Head portion 38c of member 38 may be formed into the stepped configuration illustrated, including rearward section 39, intermediate section 39a and forward section 39b. Forward section 39b at its distal end may be bent upwardly to form a lip 40. Foot portion 38a is coupled to one side of the line of the source of electrical current by insulation covered conducting line 42 while the other side of the source is connected by insulation covered conducting line 42a to the electrical motor, as for instance to the stator 18 thereof.

A pair of spaced embossments or pins 44 may be provided in the handle section 14 and between which is received in snug, holding relation the body portion 38b of member 38, for mounting the latter in position in the handle portion where it preferably resiliently reacts against the trigger 32. In other words, the tension on member 38 is preferably such that it is forcibly engaged with pins 44 and is maintained in position in the handle portion against the rearward end of the trigger member 32. As can be readily seen, the outwardly bowed configuration of body section 38b of member 38 provides for positive engagement with the rearward end of trigger member 32.

Operation of the control may be as follows: When the operator's fingers squeezes the trigger member 32 and moves it rearwardly in slot 34, the trigger engaging the body section 38b of the member 38 forces the latter to pivot rearwardly (FIG. 1) and causes the intermediate section 39a of head portion 38c of member 38 to cam against the electrical conducting housing or cap 28 of the brush assembly 24a, and upon further inward movement of the trigger, section 39b of the member 38 is forced in positive electrical conducting relation beneath the cap of brush assembly 24a, thus coupling the line 42 to the motor to complete the circuit to the motor. Positive energization of the motor thus occurs. Lip 40 insures that overtravel of member 38 with respect to brush assembly 24a will not occur. Stop 46 in handle portion 14 may also be provided adapted for engagement with member 38 to limit rearward pivotal movement of member 38.

Upon release of the force of the finger of the operator, the spring-like whip member 38 automatically moves the trigger outwardly, and moves away from coupling contact with the cap 28 of brush assembly 24a, thus uncoupling one side of the line from the motor, to cause deenergization of the motor, Member 38 continues to urge the trigger member 32 outwardly toward off position, and when lug 36 thereon engages the shoulder 37, further outward movement of the trigger member is stopped.

From the foregoing description and accompanying drawings it will be seen that the invention provides a novel control for an electrically powered tool, and especially a control which is of simple and economical construction for controlling energization and deenergization of an electric motor, and wherein the electrical conducting member which transmits current from one side of the line to the motor also serves as the spring means for urging the trigger to an off position.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a control for tools, and power appliances comprising a support, a trigger mounted on said support and movable with respect thereto, said trigger being movable from an off position to an on position and from said on position to said off position, and movable electrical current conducting means for conducting current to an electric motor, said electrical conducting means coacting with said trigger and being operative to normally automatically urge said trigger to said off position upon release of said trigger from exterior actuating force, said trigger being operative in said on position to cause said electrical conducting means to be moved into electrical conducting engaged relation with an associated brush assembly of said motor for completing the circuit to said motor.

2. A control in accordance with claim 1 wherein said electrical conducting means comprises a spring-like member having a portion thereof resiliently engaging said trigger, said member being operative to automatically move said trigger to said off position and automatically deenergize the motor upon release of said trigger from exterior actuating force.

3. A control in accordance with claim 1 wherein said electrical conducting means comprises a one piece strip-like member having spring-like characteristics and including means thereon for coupling the member to a source of current and other means thereon adapted for slidable engaging coaction with the brush assembly of the electrical motor for coupling the motor into circuit for energization thereof upon movement of said trigger to said on position, said spring-like member having a portion thereof coacting with said trigger in resiliently engaged relation and urging said trigger to said off position.

4. In a control for tools and power appliances comprising a support, a trigger mounted on said support and movable with respect thereto, said trigger being movable from an off position to an on position and from said on position to said off position, and electrical current conducting means for conducting current to an electric motor, said electrical conducting means coacting with said trigger and being operative to normally urge said trigger to said off position, said trigger being operative in said on position to cause said electrical conducting means to be disposed in electrical conducting relation to said motor for completing the circuit to said motor, said electrical conducting means comprising a one piece strip-like member having spring-like characteristics and including means thereon for coupling the member to a source of current and other means thereon adapted for coupling coaction with the electrical motor for coupling the motor into circuit for energization thereof upon movement of said trigger to said on position, and wherein said strip-like member includes a foot portion comprising the first mentioned coupling means adapted for coupling to a source of current, and a body portion of arcuate configuration and a head portion, said head portion comprising said other coupling means and being of step configuration in side elevation for camming coaction with an associated brush assembly of the electrical motor and upon pivotal movement of said body portion toward and away from said brush assembly.

5. A control in accordance with claim 1 in combination with a series commutator motor comprising the electric motor, said electrical conducting means being adapted to coact in engaged sliding electrically conducting relation with one of the brush assemblies of the motor for completing the circuit to the motor upon movement of said trigger to said on position, and being adapted to automatically disengage from said one brush assembly upon release of said trigger from exterior actuating force.

6. A control in accordance with claim 5 wherein said support comprises a housing of a tool, said housing having a recess therein in which said trigger is mounted for reciprocal movement, said electrical conducting means comprising a vertically elongated body portion of arcuate configuration in side elevation adapted for resilient engagement with said trigger in the on position of said trigger, and a head portion normally spaced from said one brush assembly but movable into electrical conducting contacting engagement with said one brush assembly upon movement of said trigger toward said on position.

7. A control in accordance with claim 6 wherein said one brush assembly comprises an electrical conducting brush housing with a brush reciprocably movable in said brush housing and disposed in electrical conducting relation to said brush housing, said electrical conducting means being movable into current conducting engagement with said brush housing upon movement of said trigger toward said on position.

8. A control in accordance with claim 6 wherein said electrical conducting means comprises a flat spring-like member of generally inverted L-shaped configuration in side elevation and wherein said body portion adjacent the lower end thereof is clasped between two generally opposing abutments on said tool housing for anchoring said electrical conducting means with respect to said housing and providing a whip-like action to said spring-like member.

9. A control in accordance with claim 6 wherein said trigger and said housing are formed of electrical insulating material for non-conducting of current.

10. An electrical conducting member adapted for assembly in a tool for coaction with a non-conducting trigger of the tool for applying current to the electric motor of the tool, said electrical conducting member comprising a flat spring-like member of electrical conducting material having a body portion and a head portion with said body portion being adapted for engagement with the trigger of the tool for urging the trigger toward off position, and with said head portion being adapted for movement upon flexure of said body portion, into engagement with one of the brush assemblies of the motor for completing the circuit to the motor upon movement of the trigger toward on position.

11. An electrical conducting member in accordance with claim 10 wherein said body portion is of convex configuration in side elevation and said head portion is generally horizontally oriented and is forwardly extending from said head portion, and a generally horizontally oriented forwardly extending foot portion of materially lesser extension as compared to said head portion, said foot portion being adapted for coupling to a line conductor for applying current to said electrical conducting member, and said head portion being of stepped configuration in side elevation.

12. A control in accordance with claim 6 wherein said trigger is mounted in a depending handle section of said housing for generally horizontal reciprocal movement, the rear surface of said trigger engaging said electrical conducting means with the upper section of said rear surface being of generally circular segmental configuration in side elevation and the lower section of said rear surface being of a materially flatter configuration in said elevation.

13. In a control for tools, and power appliances, comprising a support, a trigger mounted on said support and movable with respect thereto, said trigger being movable from an off position to an on position and from an on position to an off position, and movable electrical current conducting means for conducting current to an electrically powered means, said electrically conducting means coacting in engaged relation with said trigger and being operative to normally automatically urge said trigger to said off position upon release of said trigger from exterior actuating force, said trigger being operative in said on position to cause said electrical conducting means to be moved into electrical conducting contacting relation with said electrically powered means for completing the circuit to the last mentioned means.

14. A control in accordance with claim 13 wherein said electrical conducting means comprises a one piece strip-like member having spring-like characteristics in the plane of movement of said trigger and engaging the latter under resistance to distortion for urging said trigger to said off position.

15. A control in accordance with claim 13 wherein said electrical conducting means comprises a one piece member having spring-like characteristics and including a foot portion adapted for coupling to a source of current and a body portion of arcuate configuration in side elevation and a head portion, said head portion being adapted for engaged electrically coupling coaction with the electrically powered means for energization thereof upon movement of said trigger to said on position, and said member being operable to automatically disengage from said engaged coaction with said electrically powered means upon release of said trigger from exterior actuating force.

16. An electrical conducting member adapted for assembly in an electrically powered device such as a portable hand tool or appliance, for coaction with a non-conducting trigger of the device for applying current to an electric motor of the tool, said electrical conducting member comprising a spring-like member of electrical conducting material having a body portion and a head portion with said body portion being adapted for engagement with the trigger of the tool for urging the trigger toward off position, and with said head portion being adapted for movement, upon flexure of said body portion, into engagement with one of the brush assemblies of the motor for completing the circuit to the motor upon movement of the trigger toward on position.

* * * * *